(12) United States Patent
Cutler et al.

(10) Patent No.: US 7,238,217 B2
(45) Date of Patent: Jul. 3, 2007

(54) DIESEL ENGINE EXHAUST FILTERS

(75) Inventors: Willard A. Cutler, Big Flats, NY (US); Patrick D. Tepesch, Corning, NY (US); Christopher J. Warren, Waverly, NY (US); David S. Weiss, Corning, NY (US)

(73) Assignee: Corning Incorporated, Corning, NY (US)

( * ) Notice: Subject to any disclaimer, the term of this patent is extended or adjusted under 35 U.S.C. 154(b) by 291 days.

(21) Appl. No.: 10/830,671

(22) Filed: Apr. 23, 2004

(65) Prior Publication Data

US 2005/0235622 A1    Oct. 27, 2005

(51) Int. Cl.
*B01D 46/24* (2006.01)

(52) U.S. Cl. .................. 55/523; 55/385.3; 55/484; 55/DIG. 30; 60/311

(58) Field of Classification Search ............... 55/282.3, 55/484, 385.3, 523, DIG. 10, DIG. 30; 60/311; 428/116
See application file for complete search history.

(56) References Cited

U.S. PATENT DOCUMENTS

| | | | |
|---|---|---|---|
| 3,853,485 A * | 12/1974 | Hogan | .................. 502/300 |
| 4,390,355 A | 6/1983 | Hammond, Jr. et al. | |
| 4,810,554 A * | 3/1989 | Hattori et al. | ............... 428/116 |
| 4,857,089 A | 8/1989 | Kitagawa et al. | |
| 5,130,100 A * | 7/1992 | Serizawa | ..................... 422/180 |
| 5,144,798 A * | 9/1992 | Kojima et al. | ................. 60/303 |
| 5,171,335 A * | 12/1992 | Kojima et al. | ................. 55/523 |
| 5,914,187 A | 6/1999 | Naruse et al. | |
| 5,916,133 A * | 6/1999 | Buhrmaster et al. | .......... 60/297 |
| 6,544,310 B2 | 4/2003 | Badeau et al. | |
| 6,673,414 B2 | 1/2004 | Ketcham et al. | |
| 6,843,822 B2 * | 1/2005 | Beall et al. | .................... 55/523 |
| 6,902,599 B2 * | 6/2005 | Bardon | ........................ 55/523 |
| 7,056,365 B2 * | 6/2006 | Ichikawa et al. | ............. 55/523 |

FOREIGN PATENT DOCUMENTS

| | | |
|---|---|---|
| EP | 1 384 507 | 1/2004 |
| WO | WO 02/081878 A1 * | 10/2002 |
| WO | WO 02/089979 A2 * | 11/2002 |

* cited by examiner

*Primary Examiner*—Scott Bushey
(74) *Attorney, Agent, or Firm*—Kees van der Sterre

(57) ABSTRACT

Diesel engine exhaust filtration systems, and ceramic honeycomb wall flow exhaust filters for such systems, wherein the filters comprise axially centralized filter sections having a higher heat capacity and/or a higher gas flow resistance than peripheral filter sections disposed radially outwardly thereof, the filters thereby exhibiting increased resistance to thermal damage from filter regeneration over-heating.

6 Claims, 2 Drawing Sheets

DIESEL ENGINE EXHAUST FILTERS

BACKGROUND OF THE INVENTION

The present invention relates to filters for the removal of particulate material from diesel engine exhaust streams, and more particularly to porous ceramic diesel exhaust filters of honeycomb configuration offering improved resistance to thermal shock and other damage under conditions encountered in diesel engine exhaust systems.

Ceramic honeycomb particulate filters or traps have proven to be extremely efficient at removing carbon soot from the exhaust of diesel engines. Such filters are generally of so-called wall-flow design in that the soot is separated from the engine exhaust stream by capture on the porous channel walls of a honeycomb filter body as the exhaust gases are forced through the porous ceramic walls separating an array of filter inlet channels from an adjacently interspersed array of filter outlet channels. Wall-flow filters can be designed to provide for nearly complete filtration of soot without significantly hindering the exhaust flow.

In the normal course of using such a filter in the manner described, a layer of soot collects on the surfaces of the filter inlet channels. The reduced wall permeability caused by the presence of this soot layer increases the pressure drop across the filter and thus increases back pressure in the engine exhaust system. This causes the engine to work harder and adversely affects engine operating efficiency.

This soot-induced pressure drop periodically increases to a point where regeneration of the filter becomes necessary. Regeneration typically involves heating the filter to initiate the combustion and removal by oxidation of the carbon soot layer. Desirably this regeneration is accomplished under controlled conditions of engine management involving a slow burn of the soot deposits over a period of several minutes. The temperature in the filter during such regeneration can rise from about 400–600° C. to a maximum of about 800–1000° C.

Under certain circumstances, however, a so-called "uncontrolled regeneration" can occur, wherein soot combustion is initiated coincidentally with or immediately preceding a period of engine idle at low exhaust gas flows and relatively oxygen-rich conditions. In that case the combustion of the soot may produce large temperature gradients and temperature spikes much higher than 1000° C., which can thermally shock and crack, or even melt, the filter.

In addition to capturing the carbon soot, the filter also traps metal oxide "ash" particles that are carried by the exhaust gas. These particles are not combustible and, therefore, are not removed during regeneration. If temperatures during an uncontrolled regeneration are sufficiently high, the ash can sinter to the filter and/or react with the filter to initiate partial melting.

In view of these circumstances the development of filter designs and engine control systems that can better manage the regeneration cycle and improve the resistance of these ceramic exhaust filters to thermal regeneration damage continues to be a major focus of diesel engine exhaust system engineering effort.

SUMMARY OF THE INVENTION

The present invention provides ceramic wall flow filter designs offering significantly improved resistance to thermal shock damage arising from uncontrolled filter regeneration and other adverse conditions of use. Also provided are improved processes for diesel engine exhaust emissions control enabled by the use of such filter designs.

The filters of the invention are particularly well adapted to address the problem of filter cracking or other damage due to high radial temperature gradients that can arise across the diameter of the filter. While somewhat dependent upon the particular exhaust system design being employed, it is found that substantially higher operating and regeneration temperatures are typically reached in filter volumes disposed on and adjacent to the longitudinal filter axis, i.e., the central axis of the filter running parallel with the inlet and outlet channels of the honeycomb structure. Since the peripheral sections of the filter are generally better cooled than axial filter sections, the radial temperature gradient from the filter central axis to the filter outer skin can be particularly large and problematic.

In accordance with the invention the magnitude of radial temperature gradients arising within such filters is reduced by one or a combination of filter design features. In one approach the heat capacity of axial sections of the filter is increased, relative to that of peripheral filter sections. This can be accomplished, for example, by increasing the thickness and/or changing the composition of the channel walls within the axial section of the filter. A second approach is to modify the channels walls of the filter to reduce exhaust gas flow through the axial section of the filter. Measures such as reducing wall porosity or increasing wall thickness in axial filter portions are effective for this purpose. The result of these measures is that the quantity of combustible soot present in those sections is reduced, and the quantity of soot present in peripheral filter sections relatively increased, in comparison with the quantities present in conventional filters of otherwise similar design operated under similar conditions.

Including one or both of these features in the filter design can substantially reduce temperature spikes in uncontrolled filter regenerations. In addition, radial temperature gradients during controlled regenerations are smaller. Accordingly, these filters are generally more resistant to thermal damage such as cracking, ash sintering and melting under normal as well as adverse operating conditions.

In a first aspect, therefore, the invention includes a ceramic honeycomb wall-flow filter conventionally comprising an array of parallel channels separated by porous channel walls running parallel with the central axis of the filter in a gas flow direction from a gas inlet end to a gas outlet end of the filter. The channel array includes a plurality of inlet channels closed at the gas outlet end separated by the porous channel walls from a plurality of outlet channels closed at the gas inlet end, such that exhaust gases entering the inlet channels must pass through the channel walls into the outlet channels prior to discharge form the filter outlet, and such that soot and other particulates present in the gas stream are trapped on or within the channel walls.

For the purpose of improved thermal durability, the channel walls of an axial group of inlet and outlet channels in the filter of the invention are made to differ from the channels walls of a peripheral group of inlet and outlet channels disposed about the axial group of channels. More particularly the axial group of inlet and outlet channels will comprise channels walls of higher heat capacity and/or higher gas flow resistance than the channels walls within the peripheral group of channels.

In a second aspect the invention includes an exhaust system for removing particulates from a diesel engine exhaust stream employing a ceramic wall-flow particulate filter such as above described. That system includes first an enclosure for the filter that is spaced from but connected to the engine exhaust manifold by a suitable length of exhaust conduit. The enclosure will generally include an integrally formed or permanently attached inlet cone for distributing the exhaust stream entering the enclosure across the diameter of the enclosure and over the inlet end of the filter.

Mounted within the enclosure is an improved ceramic honeycomb wall flow filter such as above described, the filter being disposed with its inlet end proximate to the inlet cone and its outlet end downstream from the inlet end in the direction of flow of the exhaust stream. Thus the inlet and outlet channels of the filter, being parallel with the filter central axis running from the filter inlet to the filter outlet, will be parallel with the direction of exhaust gas flow through the enclosure.

For enhanced exhaust system performance and durability, the filter includes an axial group of inlet and outlet channels, disposed on and proximate to the filter central axis, that differ at least in physical characteristics from the remaining inlet and outlet channels of the filter. Specifically, the channel walls of the axial group of channels are of higher heat capacity and/or higher gas flow resistance than the channels walls of peripheral channels disposed outwardly of the axial group with respect to the filter central axis. The higher heat capacity and/or higher gas flow resistance of the axial group effectively reduce thermal gradients arising within the filter during the soot combustion associated with filter regeneration, thereby significantly enhancing the service life of the exhaust system.

DESCRIPTION OF THE DRAWINGS

The invention is hereinafter further described with reference to the appended drawings, wherein.

DETAILED DESCRIPTION

One approach to filter design that results in both higher heat capacity and higher gas flow resistance in the channel walls of the axial group of channels is that of increasing the channel wall thickness of the axial channel group relative to that of the peripheral channel group. The increased wall thickness adds material to the axial portion of the section filter that tends to reach higher regeneration temperatures than peripheral filter sections, thereby increasing axial heat capacity and reducing peak axial temperatures.

Further, this increased wall thickness has the additional effect of increasing the gas flow resistance of the walls, thereby shifting the balance of exhaust gas flow away from the axial channel group toward peripheral channels. This shift causes a relative reduction in soot accumulation in axial filter portions of the filter, relative to soot accumulations developed in prior art filters. Again, the result is that peak regeneration temperatures reached along axial portions of the filter are reduced.

Figure 1:
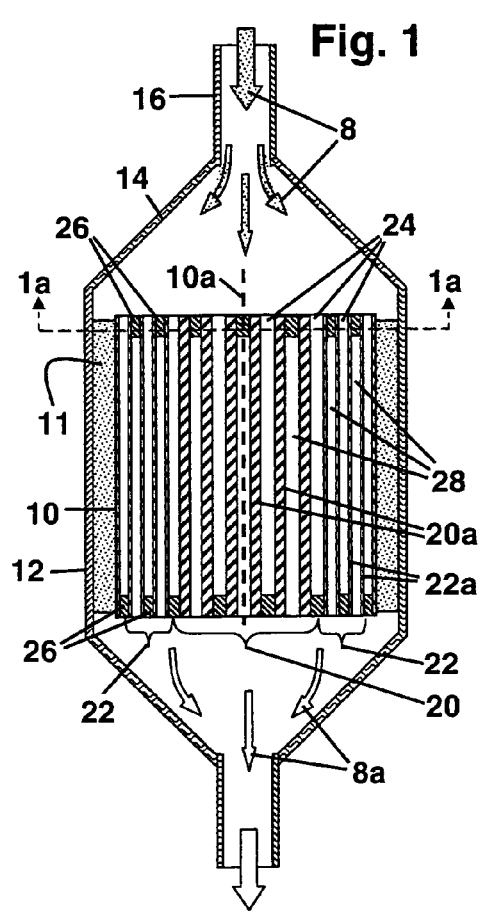
FIGS. 1 and 1*a* schematically illustrate a first embodiment of an exhaust filter and enclosure provided in accordance with the invention, FIGS. 2 and 2*a* schematically illustrate one alternative embodiment of an exhaust filter and enclosure provided in accordance with the invention.

FIG. 1 of the drawings is a schematic illustration, not in true proportion or to scale, showing a cross-sectional elevational view of a diesel filter 10 supported in an enclosure 12 with a resilient mat 11, the enclosure being attached via an inlet cone 14 to an exhaust conduit 16. As shown in FIG. 1, an axial group of channels 20 disposed about the longitudinal axis 10*a* of filter 10 comprise channel walls 20*a* that are thicker than the channel walls 22*a* of a peripheral group of channels 22 disposed about the periphery of filter 10.

In the operation of filter 10, diesel exhaust gases indicated by arrows 8, comprising particulate pollutants such as particulate carbon generated by an operating engine (not shown), are conveyed via exhaust conduit 16 into inlet cone 14 and enclosure 12, being distributed by cone 14 across the entire face of filter 10. The incoming gases then enter filter 10 via open filter inlet channels such as channels 24, i.e., those channels in channel groups 20 and 22 that are open at their upper ends and closed at their lower ends by channel plugs such as plugs 26.

Due to blockage by plugs 26 the exhaust gases are forced through channel walls 20*a* and 22*a* and into the filter outlet channels, i.e., those channels in channel groups 20 and 22 such as channels 28 that are plugged at their upper ends and open at their lower ends. After discharge from those outlet channels the thus-filtered exhaust gases are then collected and discharged from the bottom of enclosure 12 as indicated by arrows 8*a*.

Figure 1A:
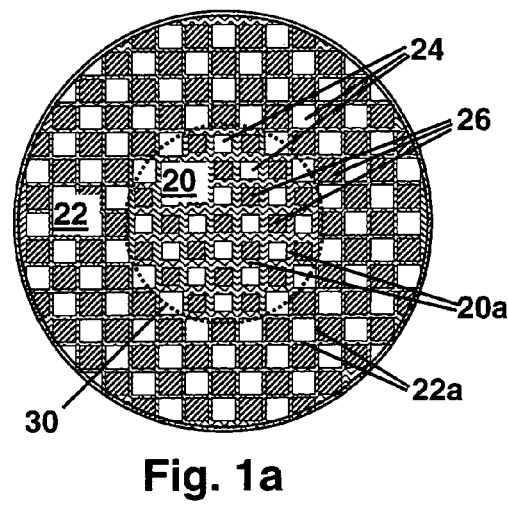

FIG. 1*a* is a schematic and somewhat enlarged top plan view of filter 10 taken along line 1*a*—1*a* of FIG. 1. Broken line 30 in FIG. 1*a* indicates the approximate boundary between axial channel group 20 and peripheral channel group 22.

In particular case illustrated in FIGS. 1 and 1*a*, the entire wall structure of filter 10 is composed of a common porous ceramic material. Thus the heat capacity of the thickened wall structure present in axial channel group 20 is higher than that of the wall structure present in peripheral channel group 22. In addition, thickened channel walls 20*a* are less permeable to exhaust gas than channel walls 22*a*, reducing exhaust gas flow through, and carbon particulate buildup on, those walls. Accordingly, peak regeneration temperatures for filter 10 that normally occur on and proximate to filter axis 10*a* are lower than for prior art filters of the same average channel wall thickness, as all channel walls of the prior art filter are of the same gas permeability and heat capacity.

Of course increasing channel wall thickness comprises only one method for increasing heat capacity and/or increasing the gas flow resistance of the channel walls of the axial channel group; other methods for modifying axial group properties may also be employed. For example, the axial portions of a honeycomb structure to be used for fabricating a filter can be formed of a different ceramic composition than the composition used to form peripheral sections of the filter. The material used for the axial portion may thus have a higher heat capacity and/or a lower porosity than the material used to form the peripheral sections.

Channel coating approaches may also be useful for this purpose. Thus coatings may be selectively applied to the channel wall surfaces of the inlet and outlet channels of the axial group, the coatings being formed of ceramic materials that can increase the heat capacity and/or reduce the gas permeability of those surfaces. Such coatings may differ in composition from the composition of the channel walls, or they may be the same. Alternatively, supplemental treatments designed to modify wall permeability may be selectively applied to either the axial or the peripheral channel group, such treatments including chemical treatments to increase or decrease wall porosity and/or heat treatments to decrease such porosity.

As is evident from a study of FIGS. 1 and 1a, the cell density of the filter (number of channels per unit of filter cross-sectional area in the plane perpendicular to the filter axis) in that embodiment of the invention is the same in both the axial and peripheral channel groups. If this is a design constraint, then reducing the sizes of the inlet and outlet channels in the axial channel group to increase channel wall thickness as shown those drawings is a straightforward approach for increasing axial heat capacity and decreasing axial gas flow.

Another approach, also based on filter designs of uniform cell density, involves the use of a wall-thickened filter design similar to that of FIG. 1, but wherein the approach to channel wall thickening is selective. In these embodiments, wall thickening is achieved by selectively reducing the sizes of only the outlet channels in the axial channel group, with the sizes of the inlet channels in the axial group generally remaining the same. The average outlet channel cross-sectional area in the axial group is thus most generally smaller than the average outlet channel cross-sectional area in the peripheral group.

In the usual case, the average inlet channel cross-sectional area in the axial channel group will be substantially equivalent to the average inlet channel cross-sectional area in the peripheral channel group. However, equivalent functionality can be achieved by increasing the sizes of the inlet channels in the peripheral channel group relative to the sizes of the inlet channels in the axial channel group. This approach achieves channel wall thinning in the peripheral channel group relative to the axial channel group, increasing gas flow and particulate soot buildup in peripheral portions of the filter relative to gas flows and soot buildup in axial filter portions. This flow pattern thereby also reduces radial temperature gradients developed in the filter during filter regeneration.

Figure 2:
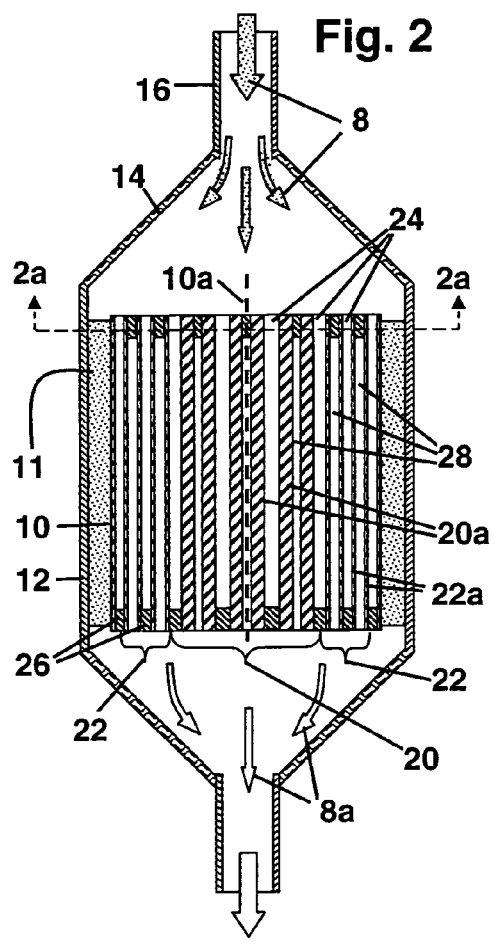
Figure 2A:
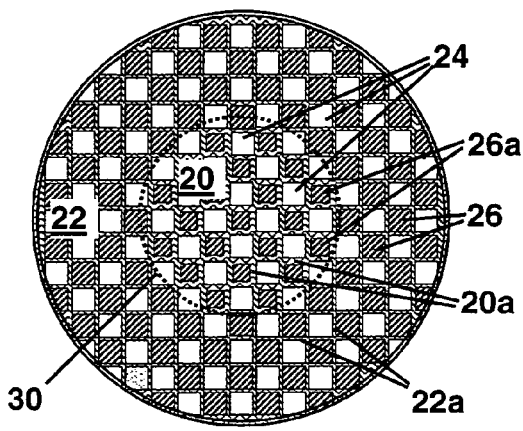

FIGS. 2 and 2a of the drawing comprise schematic side elevational and partial top plan views of a wall flow filter wherein wall thickening in the axial group of inlet and outlet channels has been achieved by selectively reducing the sizes of the outlet cells in the axial group. The elements and numbering of elements in FIGS. 2 and 2a match those of corresponding elements in FIGS. 1 and 1a.

As best seen in FIG. 2a, inlet channels 24 located both inside and outside of axial channel group 20 in this filter are all of substantially the same cross-sectional area. However, outlet channels 26a located within axial channel group 30 are reduced in cross-sectional area compared to outlet channels 26 located outside of the axial group. It is this reduction that produces the axial wall thickness difference between channel walls 20a and channel walls 20 of the filter.

In yet another embodiment of the present invention the heat capacity of the axial group of inlet and outlet channels is increased by selectively increasing the cell density of the filter within the axial group. This approach, whether used alone or in combination with wall thickening or other heat capacity control methods as hereinabove described, increases the volume of channel wall material present in axial portions of the filter and thereby increases filter heat along the filter axis.

Figure 3:
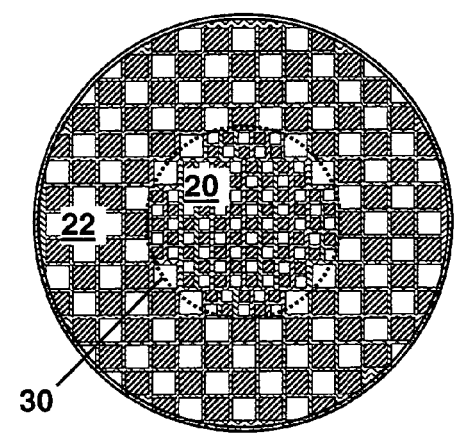
FIG. 3 schematically illustrates another alternative embodiment of an exhaust filter provided in accordance with the invention.

A schematic top plan view of a filter of this design is illustrated in FIG. 3 of the drawings. As shown in FIG. 3, the cell density in axial channel group 20 approximately delineated by boundary 30 is higher than the cell density in peripheral channel group 22. Therefore, provided that the channel wall thicknesses in channel groups 20 and 22 are substantially the same, the mass of the axial channel group, and thus the heat capacity of that group, are higher than the mass and heat capacity of the peripheral channel group.

The invention is further described below with reference to specific examples and embodiments thereof, which are intended to be illustrative rather than limiting.

EXAMPLE 1

Wall Thickened Filter

A conventional plasticized batch for ceramic honeycombs is first compounded of kaolin clay, talc, and alumina, these ingredients being provided in proportions suitable for developing a cordierite crystalline phase in the honeycomb following drying and firing. The batch further includes a methylcellulose temporary binder, a stearate lubricant, and water in a proportion sufficient to impart good plastic forming characteristics to the batch.

The batch thus provided is extruded through a steel honeycomb die of generally conventional design, wherein the plasticized mixture is conveyed into the die through an array of feedholes provided on the die entrance face. This batch is then fed within the die into an array of intersecting discharge slots opening onto the die discharge face for forming the batch into an intersecting honeycomb wall structure that is extruded from the discharge face as a honeycomb extrudate about 15 cm (6 inches) in diameter and of generally cylindrical shape wherein the honeycomb channels or cells formed by the walls run parallel to the direction of extrusion and the cylinder axis of the extrudate. The slots in the array have a starting slot width of about 0.3 mm (0.012 inches), and are spaced to produce a square-channeled cylindrical honeycomb having a cell density of 31 channels/cm$^2$ (200 channels/in$^2$) in planes perpendicular to the axis of extrusion of the honeycomb after subsequent firing.

To extrude honeycombs with a modified wall structure in accordance with the invention, the discharge slot array of this extrusion die is modified prior to extrusion to increase the width of the discharge slots in a central section of the die discharge face. The method of widening those slot sections is an electrical discharge machining (EDM) method such as disclosed in U.S. Pat. No. 6,570,119, incorporated herein by reference. An EDM electrode comprising an array of outwardly extending blades is selectively applied to the central section of the die discharge face to widen only slot segments within that central section. The slots in peripheral sections of the discharge face are not machined. The thus-machined slots in the central portion of the discharge space have a width of about 0.508 mm (0.020 inches).

As a natural result of this slot widening, all of the so-called "pins" defined and bounded by the widened slots in the central section of the extrusion die are reduced in size. This produces smaller inlet and outlet channel cross-sections as well as a thickened wall structure in the central portion of the cross-section of the honeycomb extrudate produced by the die.

Sections cut from the honeycomb extrudate thus provided are dried and fired to convert the sections into cordierite honeycombs. Selected sections of the honeycombs are then alternately plugged in a checkerboard pattern in the manner conventional for the production of ceramic wall flow filters. A flowable ceramic cement of conventional composition is used to plug the outlet channels on the filter entrance face and to plug the inlet channels on the filter discharge face.

The cement plugs thus provided are cured by drying and firing to form the completed wall flow filter.

Calculations indicate that both the heat capacity and gas flow resistance in the central portion of the wall flow filter are significantly enhanced by the modifications in channel size and channel wall thickness in that portion. Thus the heat capacity of [each channel][the central honeycomb section] is increased by about 56% due to wall thickening. At the same time, the gas flow resistance through the central portion of the filter is increased by about 40%, due both to wall thickening and to the reduction in inlet and outlet channel size. Accordingly, a significant drop in peak regeneration temperatures along the axis of this honeycomb filter is provided.

EXAMPLE 2

Wall Flow Filter with Selective Wall Thickening

A plasticized batch for a ceramic honeycomb incorporating clay, talc alumina, a temporary binder, a lubricant, and water is compounded as described in Example 1 above. The batch thus provided is then extruded through a steel honeycomb die generally as described in Example 1 to produce a cylindrical honeycomb extrudate suitable for conversion to a wall flow filter. The slots in the discharge slot array for this honeycomb die again have a peripheral slot width of about 0.3 mm (0.012 inches), and are spaced to produce a square-channeled honeycomb cell density of 31 channels/cm$^2$ (200 channels/in$^2$) in the honeycomb extrudate after subsequent firing.

To extrude honeycombs with a modified wall structure in accordance with the invention, the discharge slot array of this extrusion die is again selectively modified prior to extrusion to increase the width of the discharge slots in a central section of the die discharge face. As in Example 1, the method of widening those slot sections is an electrical discharge machining (EDM) method such as disclosed in U.S. Pat. No. 6,570,119, wherein an EDM electrode comprising an array of outwardly extending blades is selectively applied to the central section of the die discharge face.

In accordance with the present example, however, EDM slot widening is carried out selectively by machining material only from alternate pins in the pin array defined by the slots, so that only those pins are reduced in size. The remaining pins in the array are not machined and therefore retain their original size.

The result of this machining approach is a modified slot array for producing a honeycomb cross-section such as shown in FIGS. 2 and 2a of the drawings, wherein only half of the channels in the central portion of the honeycomb, like channels 26a in FIG. 2a, are reduced in cross-section. The slot segments in the central portion of the die discharge face are approximately 0.508 mm (0.020 inches) in width after this machining.

Sections cut from the honeycomb extrudate produced by this die are dried and fired to convert the sections into cordierite honeycombs. Selected sections of the honeycombs are then alternately plugged in a checkerboard pattern as described in Example 1. A flowable ceramic cement of conventional composition is used to plug the outlet channels on the filter entrance face and to plug the inlet channels on the filter discharge face. Among the outlet channels that are plugged on the inlet face are all of the channels of reduced cross-section produced by the selective EDM machining of the extrusion die described above. Following plugging, The cement plugs thus provided are cured by drying and firing to form the completed wall flow filter.

Again, calculations indicate that both the heat capacity and gas flow resistance in the central portion of the wall flow filter are significantly enhanced by these modifications in channel size and channel wall thickness. The heat capacity of the central portion honeycomb section is increased by about 56%, while the gas flow resistance through the central portion of the filter is increased by about 40% due a combination of wall thickening and reduced outlet channel size. A particular advantage of this design, however, is that the volume of the inlet channels within which particulate matter from the engine exhaust stream is to be trapped is not reduced in the central portion of the filter. Thus no reduction in the particulate storage capacity of the filter is incurred.

EXAMPLE 3

Wall Flow Filter with Inserted Core Segment

A plasticized batch for a ceramic honeycomb incorporating clay, talc alumina, a temporary binder, a lubricant, and water is compounded as described in Example 1 above. The batch thus provided is then extruded through a steel honeycomb die generally as described in Example 1 to produce a cylindrical honeycomb extrudate about 15 cm (6 inches) in diameter that is suitable for conversion to a wall flow filter. The slots in the discharge slot array for this honeycomb die have a slot width of about 0.3 mm (0.012 inches), and are spaced to produce a square-channeled honeycomb cell density of 31 channels/cm$^2$ (200 channels/in$^2$) in the honeycomb extrudate after subsequent firing.

Sections cut from the honeycomb extrudate produced by this die are dried and fired to convert the sections into cordierite honeycombs of uniform channel wall thickness and channel cross-section. Next, cylindrical core segments about 5 cm (2 inches) in diameter approximating in shape and location the central honeycomb portions bounded by broken line 30 in FIG. 3 of the drawings are core-drilled from each of the fired honeycombs, thus to produce cylindrical honeycombs with large cylindrical openings lying on the cylinder axes.

To provide a composite ceramic honeycomb from one of these core-drilled honeycomb shapes, a cylindrical honeycomb section corresponding in size and shape to the cylindrical opening is inserted into the core-drilled shape and cemented in place with a heat-settable ceramic cement. The cylindrical honeycomb section selected for this purpose has a cell density of approximately 31 channels/cm$^2$ (200 channels/in$^2$) and a channel wall thickness of about 0.4 mm (0.016 inches). It is formed of silicon carbide, a non-oxide ceramic material having a bulk heat capacity of approximately 1.96 J/cm$^3$/° C. between 600° and 1100° C., a capacity about 24% higher that that reported for polycrystalline cordierite. A compliant heat-settable ceramic cement such as disclosed in U.S. Pat. No. 5,914,187, consisting of aluminosilicate fibers, powdered silicon carbide, a silica sol, a methylcellulose temporary binder, and water, is suitable for this purpose.

Following cementing of the silicon carbide core segment the composite honeycomb body is plugged in a checkerboard pattern as generally described in Example 1, plugging the outlet channels on the filter inlet face and plugging the inlet channels on the filter discharge face. A flowable ceramic cement of conventional composition is suitable for this purpose.

Following the drying and setting of this plugging cement, a composite wall flow filter is provided wherein the axial group of inlet and outlet channels of the cemented filter core segment have a much higher heat capacity than the peripheral group of inlet and outlet channels surrounding the core segment. Thus this composite filter exhibits significantly reduced peak temperatures along the filter axis during filter regeneration cycles than unitary filters composed only of cordierite. Thus it can survive multiple filter regenerations without cracking.

Although a composite filter such as described above in Example 3 above can exhibit acceptable thermal durability, the substantially differing thermal expansion characteristics of the core and peripheral ceramic materials place a significant strain on the compliant cement joint between the two filter segments. This joint therefore remains a potential source of filter failure. An alternative composite filter design that solves this problem is described in Example 4 below.

EXAMPLE 4

Composite Filter Design

A fired and core-drilled cordierite ceramic honeycomb shape made as described in Example 3 above is selected for further processing. Into the central opening of this shape is inserted a cylindrical cordierite honeycomb core element matching the central opening in size and shape. The cordierite core element selected for insertion has a channel wall thickness close to the channel wall thickness of the core-drilled honeycomb shape, but it has a higher cell density of about 46.5 cells/cm2 (about 300 cells/in$^2$) of honeycomb cross-section.

This core element is cemented in place with a flowable ceramic cement of conventional composition matching the cement composition used for channel plugging in Examples 1–3 above. Thereafter the inlet and outlet channels of the cemented core-drilled shape and honeycomb core are plugged in a checkerboard pattern as described in Example 1 above.

Drying and setting of the ceramic cements thus applied produces a composite wall flow filter composed entirely of cordierite. However, the ceramic core element has higher bulk density by virtue of its higher cell density. Thus the heat capacity of the core element is approximately 20% higher than the heat capacity of the core-drilled filter periphery, and the core exhibits increased gas flow resistance (a pressure drop increase of about 5%) due to its reduced channel size. While not large, this differential in heat capacity and flow resistance will be sufficient to substantially reduce the incidence of regeneration cracking in the composite honeycomb. Moreover, as the thermal expansion properties of the cordierite core substantially match those of the peripheral cordierite honeycomb, problems relating to expansion mismatch stresses in the composite structure are entirely avoided.

Although the foregoing examples are illustrative of filter designs incorporating a step change in filter properties from the core to the periphery, it will be apparent that multi-step or even smoothly graded changes in properties are also effective to increase the average heat capacity or gas flow resistance of the core relative to peripheral sections of such honeycombs. For example, the filter can be designed with continuously varying wall properties from the central channels to the outer channels by having the wall thickness vary linearly with distance from the center to the outside, e.g. from 0.024 inches to 0.016 inches from the core to the periphery.

Figure 4:
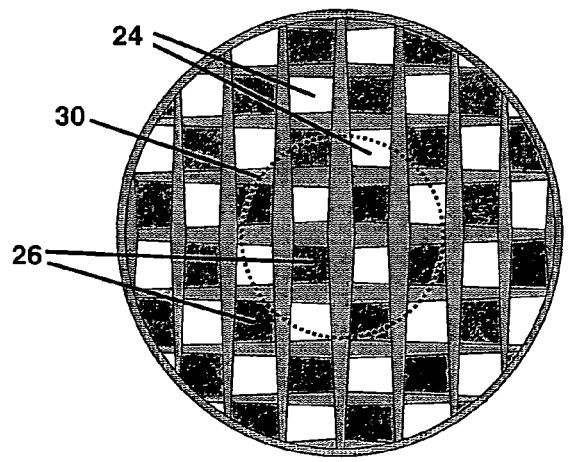
FIG. 4 schematically illustrates another alternative embodiment of an exhaust filter provided in accordance with the invention.

FIG. 4 of the drawings schematically illustrates a cross-sectional design for a filter based on graded wall thickness changes. As shown in the filter cross section of FIG. 4, the walls of the honeycomb inlet channels 24 and outlet channels 26 increase continuously in thickness from the outer portion of the cross-section to the center thereof. Accordingly, the average channel wall thickness and heat capacity in the central filter section bounded by broken line 30 in this design are higher than the average wall thicknesses in the outer portion of the cross-section.

Even more preferably, filter wall thicknesses can be varied in direct proportion to the variations in filter temperature that can arise during uncontrolled regeneration. Thus the filter could have a maximum wall thickness (e.g. at 0.024 inches) where the highest uncontrolled regeneration temperatures are observed in similarly sized test filters of uniform wall thickness, and a minimum wall thickness (e.g. at 0.016 inches) where such observed temperatures are the lowest. All other wall thicknesses would then be proportional in thickness to the uncontrolled regeneration temperatures observed at those particular wall locations in a uniform filter. As a specific example of such a design, if a maximum observed regeneration temperature in a uniform filter is 1000° C. and a minimum observed temperature is 600° C., then a wall in that filter having a regeneration temperature of 800° C. would remain at 0.020 inches thickness, while a wall having a temperature of 900° C. would be increased in thickness to 0.022 inches.

The same concept can be extended across the entire filter, and in fact applied in both axial and radial filter dimensions. Moreover, iterative changes to any particular filter design can be made by initiating uncontrolled regenerations in a first-generation thickness-adjusted design, and thereafter readjusting wall thicknesses in second- and later-generation designs to further reduce temperature gradients and overall filter mass.

A further important advantage shared by all of the filter designs of the invention is the potential for providing more uniform and complete regeneration than prior art filters. This is due primarily to the fact that regeneration temperatures in exterior portions of the filters of the invention can be higher than can be safely attained in filters of uniform wall thickness.

It is known that filters of sufficient wall thickness, e.g., of 0.020 inches thickness or higher, can be designed to survive uncontrolled regenerations despite the presence of high temperature gradients, but such filters may not regenerate completely where peripheral soot concentrations and regeneration temperatures are relatively low. On the other hand, a filter of equivalent overall mass having, for example, exterior walls of 0.016 thickness and interior walls of 0.024 inches will exhibit higher peripheral temperatures than the uniform filter, due to a more uniform soot redistribution and reduced peripheral mass. Thus soot combustion across the filter diameter will generally be more uniform and complete.

While the foregoing examples are illustrative of specific embodiments of the invention it will be recognized that similar advantages in filter efficiency and performance may be realized through the use of alternative materials, designs and procedures within the scope of the appended claims.

We claim:

1. A ceramic honeycomb wall flow filter comprising an array of parallel channels separated by porous channel walls running parallel with a central filter axis in a gas flow direction from a gas inlet end to a gas outlet end of the filter, (i) the array comprising a plurality of inlet channels closed at the gas outlet end separated by the porous channel walls from a plurality of outlet channels closed at the gas inlet end, thus to provide a gas flowpath from the inlet channels through the channel walls to the outlet channels, (ii) the channel walls of an axial group of inlet and outlet channels disposed along the central filter axis have at least one of (a) a higher heat capacity and (b) a higher gas flow resistance than the channel walls of a peripheral group of inlet and outlet channels disposed peripherally of the axial group of channels, with the average thickness of the channel walls of the axial group of inlet and outlet channels being greater than the average thickness of the channel walls of the peripheral group of inlet and outlet cells, (iii) the cell density of the axial group of inlet and outlet channels is substantially equivalent to the cell density of the peripheral group of inlet and outlet channels, (iv) the average outlet channel cross-sectional area in the axial group is smaller than the average outlet channel cross-sectional area in the peripheral group, and (v) the average inlet channel cross-sectional area in the axial group is substantially equivalent to the average inlet channel cross-sectional area in the peripheral group.

2. A ceramic honeycomb wall flow filter in accordance with claim 1 wherein the gas flow resistance of the channel walls of the axial group of inlet and outlet channels is higher than the gas flow resistance of the channel walls of the peripheral group of inlet and outlet channels.

3. An exhaust system for removing particulates from a diesel engine exhaust stream comprising:

a filter enclosure spaced from but connected to an engine exhaust manifold by a length of exhaust conduit, the filter enclosure including an inlet cone for distributing an exhaust stream from the conduit over the inlet end of a filter disposed in the enclosure, and a ceramic honeycomb wall flow filter disposed in the enclosure, the filter comprising an array of parallel gas inlet and gas outlet channels separated by porous channel walls running parallel to a central filter axis from an inlet end to an outlet end of the filter, the inlet end being proximate to the inlet cone and the outlet end being downstream from the inlet end in the direction of flow of the exhaust stream through the enclosure, wherein the channel walls of an axial group of gas inlet and outlet channels disposed along the central filter axis have at least one of:

(i) a higher heat capacity and (ii) a higher gas flow resistance than the channel walls of a peripheral group of gas inlet and outlet channels disposed peripherally of the axial group of channels, the average thickness of the channel walls of the axial group of inlet and outlet channels being greater than the average thickness of the channel walls of the peripheral group of inlet and outlet cells, the cell density of the axial group of inlet and outlet channels being substantially equivalent to the cell density of the peripheral group of inlet and outlet channels, the average outlet channel cross-sectional area in the axial group being smaller than the average outlet channel cross-sectional area in the peripheral group, and the average inlet channel cross-sectional area in the axial group being substantially equivalent to the average inlet channel cross-sectional area in the peripheral group.

4. A ceramic honeycomb wall flow filter comprising an array of parallel channels separated by porous channel walls running parallel with a central filter axis in a gas flow direction from a gas inlet end to a gas outlet end of the filter, (i) the array comprising a plurality of inlet channels closed at the gas outlet end separated by the porous channel walls from a plurality of outlet channels closed at the gas inlet end, thus to provide a gas flowpath from the inlet channels through the channel walls to the outlet channels, (ii) the channel walls of an axial group of inlet and outlet channels disposed along the central filter axis have at least one of (a) a higher heat capacity and (b) a higher gas flow resistance than the channel walls of a peripheral group of inlet and outlet channels disposed peripherally of the axial group of channels, (iii) the cell density of the axial group of inlet and outlet channels is substantially equivalent to the cell density of the peripheral group of inlet and outlet channels, and (iv) the average channel cross-sectional area of only the outlet channels but not the inlet channels in the axial group is smaller than the average outlet channel cross-sectional area in the peripheral group, or the average channel cross-sectional area of only the inlet channels but not the outlet channels in the peripheral group is larger than the average inlet channel cross-sectional area in the axial group.

5. A ceramic honeycomb wall flow filter in accordance with claim 4 wherein the average inlet channel cross-sectional area in the axial group is substantially equivalent to the average inlet channel cross-sectional area in the peripheral group.

6. A ceramic honeycomb wall flow filter in accordance with claim 4 wherein the average inlet channel cross-sectional area in the peripheral group is larger than the average inlet channel cross-sectional area in the axial group.

* * * * *